Jan. 3, 1956

W. L. SHUCK ET AL 2,729,104

PRESSURE INDICATING AND RECORDING MACHINE
FOR INTERNAL-COMBUSTION ENGINES

Filed Dec. 20, 1948

INVENTORS:
WAYNE L. SHUCK.
WILLIAM J. HUBER.

HUEBNER, BEEHLER,
WORREL, HERZIG & CALDWELL.
By Vernon D. Beehler
ATTORNEYS

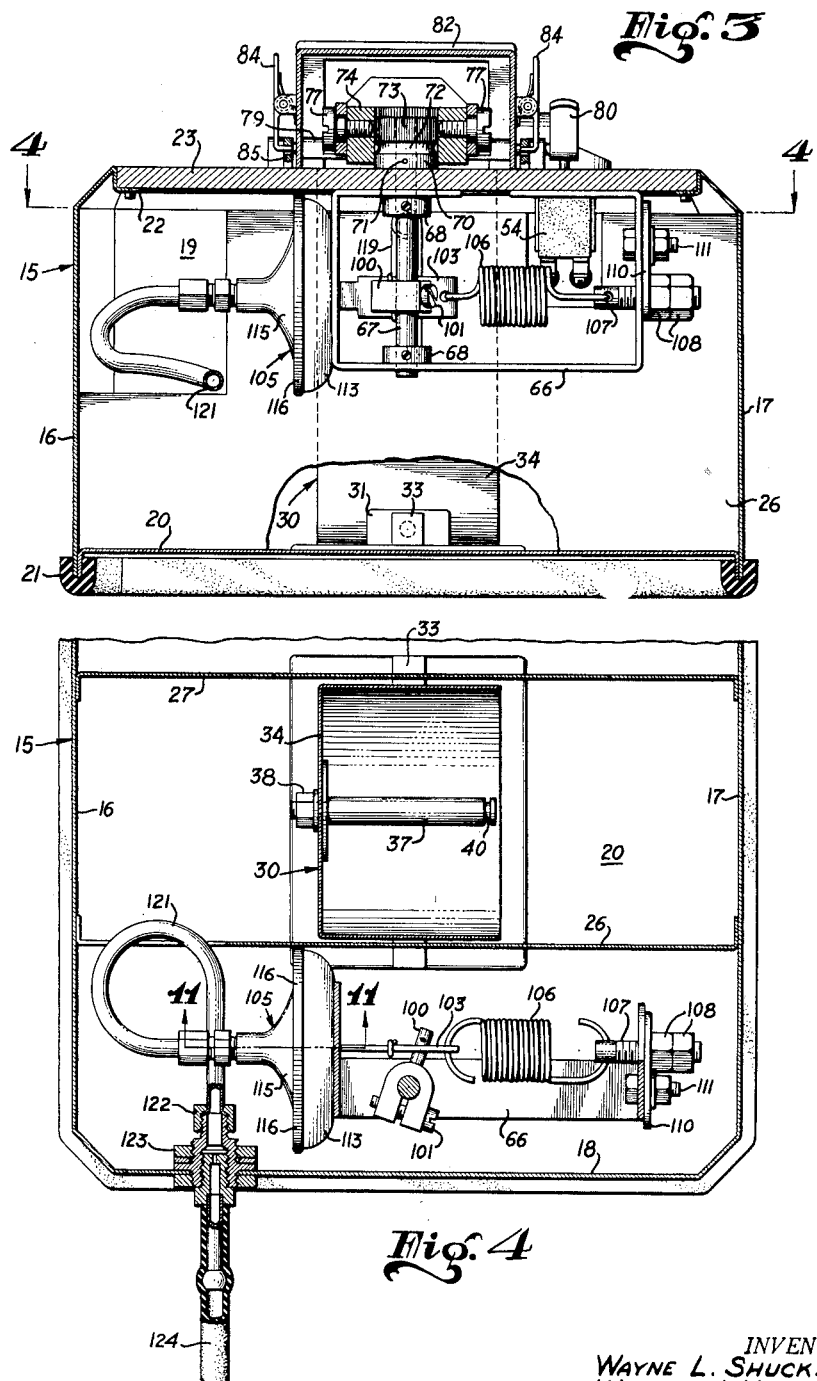

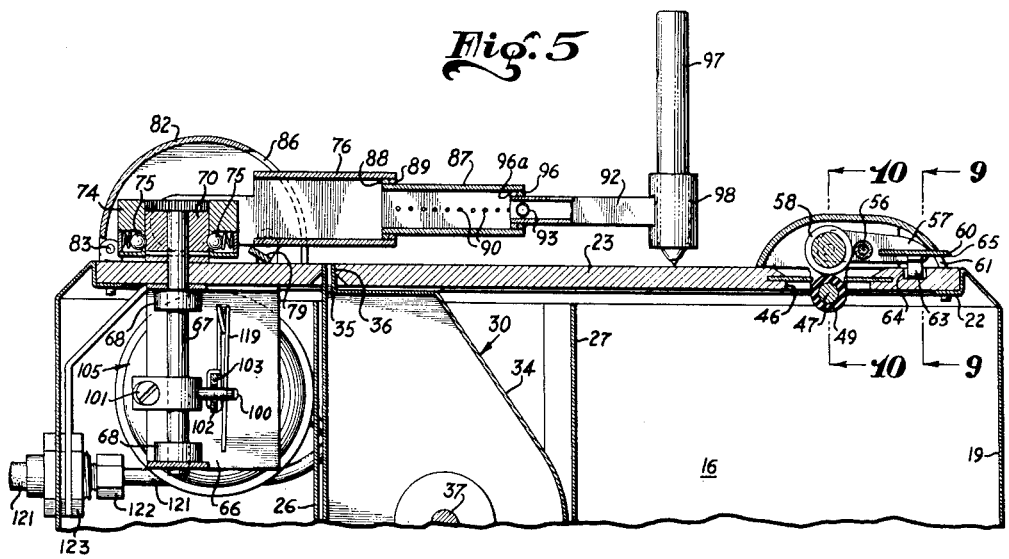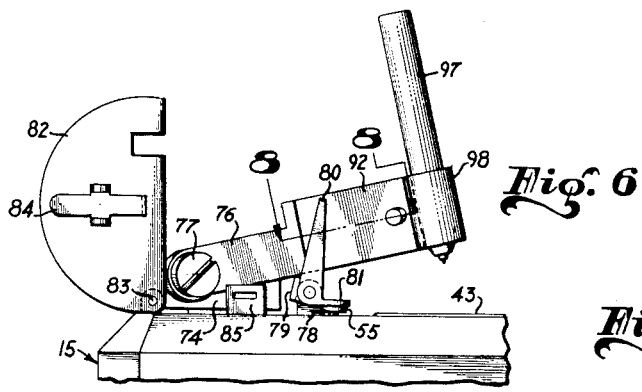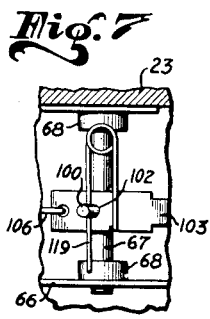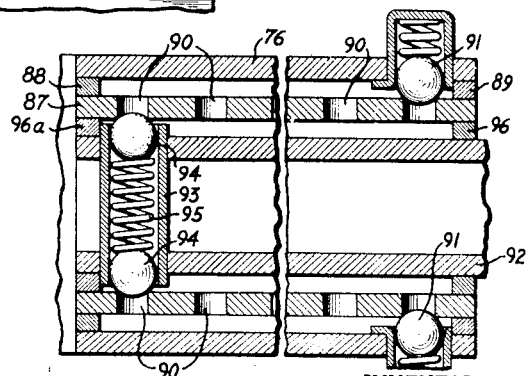

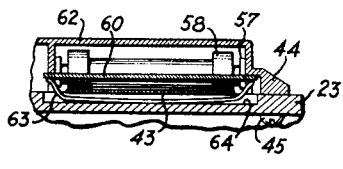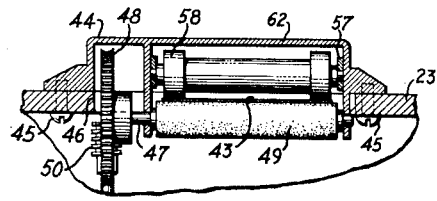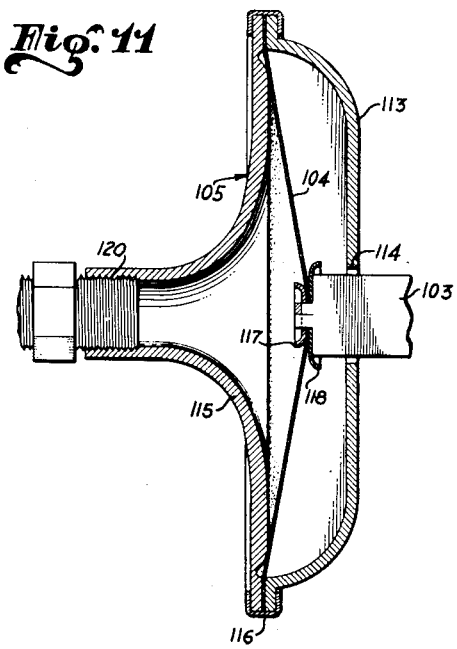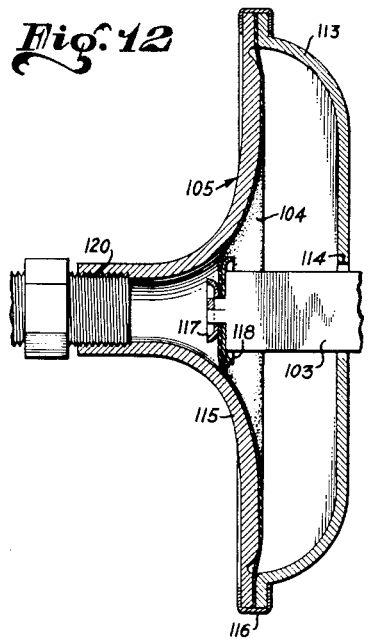

United States Patent Office 2,729,104
Patented Jan. 3, 1956

2,729,104

PRESSURE INDICATING AND RECORDING MACHINES FOR INTERNAL COMBUSTION ENGINES

Wayne L. Shuck and William J. Huber, Los Angeles, Calif., assignors to Charles D. Hirst, doing business as Challenger Mfg. Co.

Application December 20, 1948, Serial No. 66,154

5 Claims. (Cl. 73—391)

This invention relates to internal combustion engines and more especially to apparatus for determining the efficiency of operation of such engines with particular reference to the amount of pressure differential of the fuel intake thereof.

An object of the invention is to provide novel testing apparatus for internal combustion engines for determining the degree of pressure differential of the fuel intake thereof.

Another object of the invention is to provide novel testing apparatus for internal combustion engines for determining and recording the degree of pressure differential of the fuel intake thereof.

A further object of the invention is to provide novel apparatus of the character described which is portable and can be readily attached to an internal combustion engine without the necessity of moving the engine into a shop.

Another object of the invention is to provide a carbograph testing and registering apparatus for determining the pressure differential of the fuel intake of an internal combustion engine having improved features of efficiency and economy.

Another object of the invention is to provide a carbograph testing unit so designed and arranged as to provide a permanent record of the performance of an internal combustion engine with respect to a difference in pressure at the fuel intake.

A further object of the invention is to provide a carbograph pressure differential intake testing apparatus that is simple in construction, light in weight, portable in character, economical to manufacture and readily adjustable to engines of varying pressure differential at the fuel intakes.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 3 is a sectional elevational view of the same taken on the line 3—3 of Figure 2.

Figure 4 is a partial plan view in section, the section being taken along the line 4—4 of Figure 3.

Figure 5 is a partial sectional view, the section being taken along the line 5—5 of Figure 1.

Figure 6 is a fragmentary elevational view showing the stylus arm features in unoperated position.

Figure 7 is a fragmentary view showing a portion of the stylus arm actuating connection to the diaphragm.

Figure 8 is an enlarged fragmentary view in section, the section being taken along the line 8—8 of Figure 6.

Figure 9 is a sectional view taken along the line 9—9 of Figure 5.

Figure 10 is a sectional view taken along the line 10—10 of Figure 5.

Figure 11 is a view in sectional elevation of the diaphragm device showing the device in unoperated position.

Figure 12 is a view similar to Figure 11 showing the device in an operated position.

Figure 1:
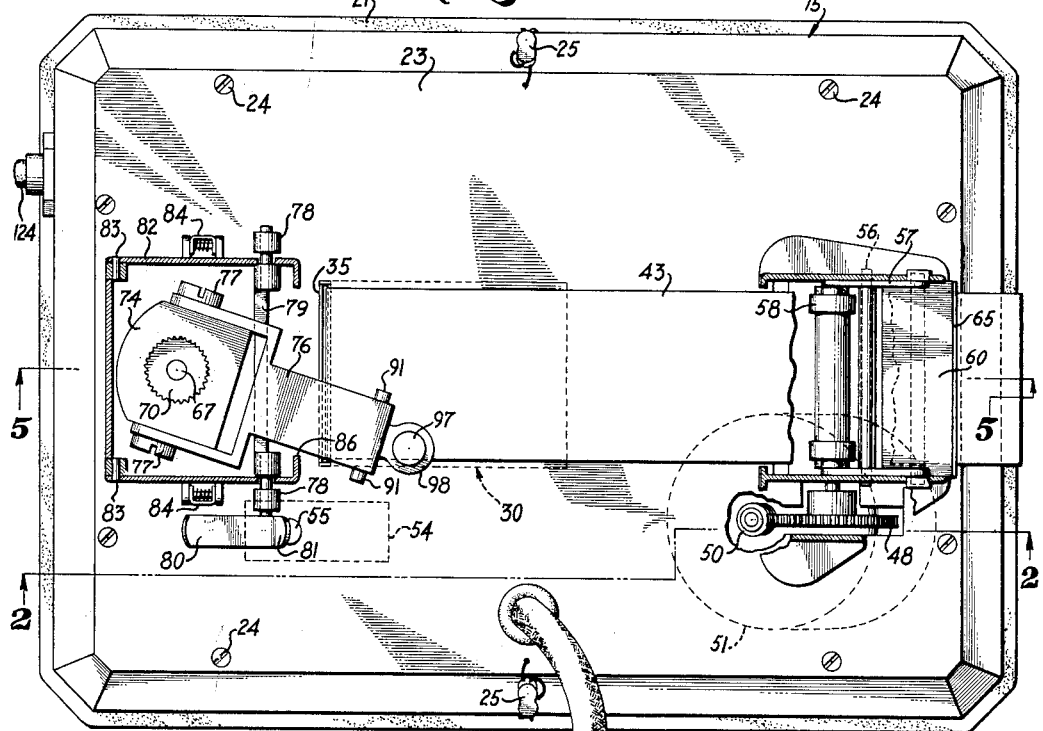
Figure 1 is a top plan view of a carbograph testing device embodying our invention.

Referring more particularly to the drawings, I show a carbograph comprising a casing 15 having side walls 16 and 17, end walls 18 and 19 and a bottom 20, these members being preferably made of pressed or formed sheet metal or of any other suitable material, the bottom 20 being formed with a marginal flange by which it is secured to the lower edge of the side walls as by welding, riveting or the like. A resilient strip 21 may be secured to this flange lower edge to provide a supporting pad or member for the device. The side and end walls are formed with a flange 22 providing a support for a top plate member 23 which may be secured to the flange as by screws 24. Top plate 23 may be additionally secured to walls 16 and 17, if desired, as by sealing devices 25 of a well-known type.

Figure 2:
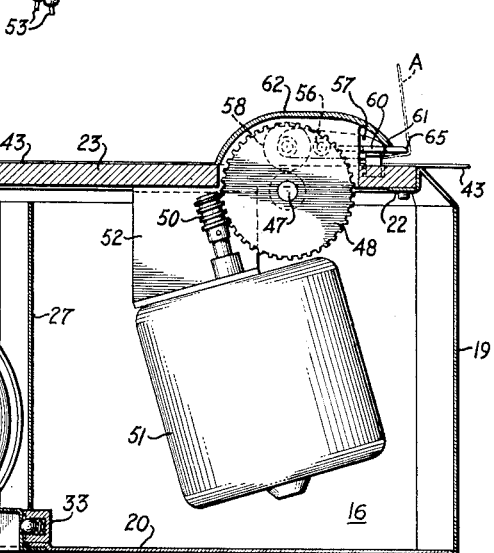
Figure 2 is a sectional elevational view of the same, the section being taken along the line 2—2 of Figure 1.

A pair of cross walls 26 and 27 are suitably provided within the casing, and bottom 20 is formed with a substantially rectangular aperture 28. A tape roller magazine 30 is provided and disposed within the chamber provided between walls 26 and 27 and the side walls and is secured to a base member 31 which has a flange 32 which extends into aperture 28 and is provided with apertures or indentations to be engaged by a plurality of spring seated ball latch elements 33 suitably secured to bottom 20. The magazine includes a shell 34 having a tapering configuration forming a narrow throat 35 which is adapted to be positioned in a similarly shaped aperture 36 in top plate 23. A rod or shaft element 37 is suitably secured to a wall of shell 34 as by a lock nut 38 and is formed with a groove 40 for engagement with a resilient clip member 41 for securing a roll of paper 42 on the shaft 37, the paper being comprised of a strip 43 which, as the roll 42 unwinds, passes through throat 35 and along the top plate 23 in a manner to be more fully described hereinafter. Magazine 30 has an open side permitting the replacement of roll 42 when a magazine has been removed from its position as shown in Figures 2 and 4 by being passed through aperture 28.

As may be seen in Figures 1, 5, 9 and 10 a frame 44 is suitably secured as by screws 45 on top plate 23 over an aperture 46 therein, the frame providing a bearing mounting for a shaft 47 having a driving gear 48 secured thereto. Shaft 47 has a resilient roller 49 mounted thereon, the roller preferably being of rubber or the like. Gear 48 meshes with and is driven by worm gear 50 on the shaft of a motor 51 which is suitably secured to a bracket 52 mounted on the underside of plate 23. Power for motor 51 is supplied by conductors 53 from a power source, the conductors being led through a suitable aperture in plate 23 and connected to the motor by a control switch 54 mounted on the underside of plate 23, the switch having a plunger actuating member 55 which passes through an aperture in plate 23.

A shaft 56 is mounted on frame 44 and supports a rockable frame 57 which provides mounting for a guide roller 58 disposed directly above the roller 49. A plate 60 is secured to frame 57 and extends outwardly through a notch or slot 61 in a cover portion 62 of frame 44. A bow spring 63 is disposed in a groove 64 in plate 23 and engages under plate 60 to hold the frame in a position with roller 58 pressing the paper strip 43 in engagement with roller 49 whereby the strip 43 is moved to the right as seen in Figures 1 and 2 when roller 49 is driven by the motor 51, the paper passing below plate 60 and above spring 63. Plate 60 has a cutting edge 65 so that an end portion of strip 43 may be torn off after passing the rollers as indicated at A in Figure 2.

A substantially C-shaped frame 66 is mounted to the underside of plate 23 and mounts a vertical shaft 67 which is provided with a pair of thrust collars 68 and extends through an opening in plate 23. A collar 70 is mounted on the top of shaft 67 above plate 23 and is secured to the shaft as by pin 71. Collar 70 has an annular groove 72 and a toothed or peripheral portion 73 above the groove, and a bearing block 74 having a corresponding serrated aperture is mounted on collar 70 and may be held thereon as by a plurality of spring seated ball latch elements 75 whereby the block 74 may be positioned on the collar or detachably mounted on the collar 70 in any of a number of angular positions.

A yoke arm 76 is pivotally mounted on block 74 as by bearing screws 77 in a manner to permit the yoke arm to pivot freely. A pair of bearing brackets 78 provide mounting for a bar lever 79 which extends below yoke arm 76 and has an actuating arm 80 and a switch arm 81 so arranged that the lever 79, when moved from the position shown in Figures 1 and 2 to the position shown in Figures 5 and 6, will raise yoke arm 76 and switch plunger 55 will be moved to disconnect the power to motor 51 and vice versa. A semi-cylindrical cover 82 may, if desired, be provided for the end of the yoke arm 76, block 74 and the lever mechanism, the cover being pivoted at 83 on plate 23 and secured in covering position as by latches 84 engaging brackets 85 secured to the top plate. Cover 82 is formed with a marginal notch or cut-out portions 86 through which yoke arm 76 extends.

Yoke arm 76 has its free end portion formed as a hollow rectangular sectioned tube and a tubular arm member 87 of similar section is telescopically mounted therein, there being flanges or shoulders 88 and 89, respectively, formed on or secured to the members 87 and 76, respectively, to limit the extended movement of member 87 with respect to yoke arm 76. Member 87 is formed with a row of apertures 90 in the opposite side walls thereof and spring seated ball check elements 91 for engagement in these apertures are suitably mounted in adjacent side walls of member 76. An arm member 92 is telescopically disposed in member 87 and is provided with a transverse guide tube 93 for a pair of ball latch elements 94 which are urged in engagement in apertures 90 by a spring 95, there being shoulders or flanges 96 and 96a, respectively, secured to the members 87 and 92 which engage tube 93 and serve as stops for the extension of member 92 with respect to member 87. A stylus 97 such as a pen, pencil, or the like, is adjustably mounted in a stylus head portion 98 of arm member 92 for making a trace on paper strip 43 as it passes under the stylus arm.

A yoke arm 100 is suitably secured as by a lock screw 101 to shaft 67 and extends through an aperture 102 in a strap 103 which has one end secured to a diaphragm 104 of a diaphragm device 105, the other end of strap 103 being secured by a spring 106 to an adjustable stud bolt 107 held as by lock nuts 108 to a plate 110 mounted for angular adjustment by a bolt 111 to bracket 66, bolt 111 extending through a slot 112 in plate 110. By this construction strap 103 can be adjusted as to normal tension with respect to diaphragm 104 and also as to angular position or more specifically to maintain the strap accurately at right angles to the normal plane of the diaphragm.

Diaphragm device 105 comprises a shell 113 having an aperture 114 for strap 103 and a flared member 115 suitably secured as by a ring channel member 116 to shell 113, the marginal edge portion of diaphragm 104 being secured between shell 113 and member 115. Diaphragm 104 is secured to strap 103 as by a pair of circular retainers 117 and 118 which have flared marginal portions which permit flexing of the diaphragm without damage thereto during operation. Member 115 has a threaded throat 120 to which one end of a tube or pipe 121 is secured, the other end of pipe 121 being connected by a connector 122 to a fitting 123 suitably extending through an aperture in and secured to wall 18, a flexible tube 124 being suitably connected to fitting 123 and adapted for connection to the intake manifold or carburetor of an internal combustion engin.

The operation of our invention should be apparent from the foregoing description. In the normal unoperated condition of the apparatus the yoke arm 76 and the stylus arm members and stylus will be in the position shown in Figure 6, the stylus out of contact with paper 43 and switch plunger 55 held down by lever 80 placing the switch in open position. Tube 124 is connected to the intake manifold or carburetor of an internal combustion engine, and lever 80 is moved to the position shown in Figures 1 and 2 whereby the stylus arm structure lowers the stylus 97 to inscribing position on paper strip 43. This movement of lever 80 releases switch plunger 55 which is spring urged to uppermost or switch closing position whereupon motor 51 is started, causing the rotation of roller 49 which moves the paper strip 43 slowly to the right as seen in Figures 1 and 2 and outwardly from the apparatus as shown.

The pressure differential at the engine intake will be transmitted to the diaphragm device 105 causing diaphragm 104 to be moved from its normal unoperated position as shown in Figure 11 to the left as shown in Figure 12 and this movement will be transmitted through strap 103 and yoke arm 100 to shaft 67 which turns the stylus yoke arm 76 and the stylus structure including stylus 97 thus making a trace on paper 43 transversely to the direction of travel of the paper. Variations in the engine pressure differential will cause the stylus arm to move back and forth across the strip 43 making a trace the lateral extent thereof, the amplitude of swing of the stylus arm being proportional to the pressure differential, the shape of the trace revealing the character of these changes. The initial position of the trace can be adjusted by shifting block 74 on collar 70 or by an adjustment of the tension of spring 106 by stud bolt 107. Variation in the tension of spring 106 will also affect the maximum angular movement of the stylus arm and such an adjustment will be made when testing engines which have various intake pressure differentials so that the trace may at all times be contained within the borders of the paper strip. Amplitude of the stylus may also be adjusted by increasing or reducing the effective radius from shaft 67 by telescoping members 87 or 92. At the conclusion of the test, lever 80 is moved to the initial position raising yoke arm 76 and the stylus structure from the paper and effecting disconnection of switch 54 thereby stopping the motor. In order to separate the end portion of the strip containing the trace, plate 60 is depressed, releasing roller 58 from roller 49 and this end strip may be withdrawn and cut off by the knife edge 65 of plate 60. Member 115 is seen to have a tapering flare which is seen to be more gradual as the distance from the center increases as a consequence of which the movement of strap 103 is greater at lower values of pressure differential than at higher values since the diaphragm follows the shape of the flare and the effective area of the diaphragm is reduced as the pressure differential increases. Therefore the device is sensitive to all degrees of variation in pressure differential ordinarily encountered.

Spring 119 serves to hold yoke arm 100 against a side of aperture 102 and prevent lost motion at this connection.

Upon the supply of paper 42 becoming depleted, magazine 30 may be withdrawn through opening 28 in bottom 20 and the roll replaced by a new roll.

It will be observed that all of the mechanism with the exception of magazine 30 is mounted on or to top plate 23 and that if replacement or adjustment of any of the parts becomes necessary the plate can be removed from its seat on flange 22, it being necessary, however, to disconnect connector 122 from fitting 123.

While we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent devices.

Having described our invention, what we claim as new and desire to secure by Letters Patent is:

1. A graphometer comprising a casing, a removable planar top on said casing, means in the casing wall providing a removable connection to a source of pressure differential, a removable retainer in said casing adapted to hold a roll of recording paper, a paper-engaging roller in the top adjacent one edge, a motor attached to the top and suspended within said casing and drive means between the motor and the roller, a slot in said top at a location remote from the roller defining one end of a recording track for paper between the slot and the roller, a diaphragm shell in said casing suspended from said top and connected to said removable connection and having a diaphragm thereon, a substantially vertical stylus shaft rotatably mounted in said top, strap means connected between the diaphragm and the shaft at a point eccentric to and transverse to said shaft adapted to translate diaphragm movement to rotational movement in said shaft, and a stylus arm above the top connected to said shaft having a tracer adapted to lie within said recording track.

2. A graphometer comprising a casing, a removable planar top on said casing, means in the casing wall providing a removable connection to a source of pressure differential, a removable retainer in said casing adapted to hold a roll of recording paper, a paper-engaging roller in the top adjacent one edge, a motor attached to the top and suspended within said casing and drive means between the motor and the roller, a slot in said top at a location remote from the roller defining one end of a recording track for paper between the slot and the roller, a diaphragm shell in said casing suspended from said top and connected to said removable connection and having a diaphragm thereon, a substantially vertical stylus shaft rotatably mounted in said top, strap means connected between the diaphragm and the shaft at a point eccentric to and transverse to said shaft adapted to translate diaphragm movement to rotational movement in said shaft, a stylus arm above the top connected to said shaft having a tracer adapted to lie within said recording track, an adjustable spring in alignment with the direction of motion of the diaphragm and located between the strap and a portion of said top adapted to modify the rotary motion of said shaft, said stylus arm having an extendible joint therein adapted to be adjusted cooperably with the spring thereby to control the character of movement of the stylus point within the recording track.

3. A graphometer comprising a casing, a removable planar top on said casing, means in the casing wall providing a removable connection to a source of pressure differential, a removable retainer in said casing adapted to hold a roll of recording paper, a paper-engaging roller in the top adjacent one edge, a motor attached to the top and suspended within said casing and drive means between the motor and the roller, a slot in said top at a location remote from the roller defining one end of a recording track for paper between the slot and the roller, a diaphragm shell in said casing suspended from said top and connected to said removable connection and having a diaphragm thereon, a substantially vertical stylus shaft rotatably mounted in said top, strap means connected between the diaphragm and the shaft at a point eccentric to and transverse to said shaft adapted to translate diaphragm movement to rotational movement in said shaft, a stylus arm above the top having a vertically moving hinged connection to said shaft and having a tracer adapted to lie within said recording track, an elevator on said top adapted to raise said stylus to inoperative position from an operative position and a switch for the motor subject to switching on by movement of said elevator to said operative position.

4. A graphometer comprising a casing, a removable planar top on said casing, means in the casing wall providing a removable connection to a source of pressure differential, a removable retainer in said casing adapted to hold a roll of recording paper, a paper-engaging roller in the top adjacent one edge, a motor attached to the top and suspended within said casing and drive means between the motor and the roller, a slot in said top at a location remote from the roller defining one end of a recording track for paper between the slot and the roller, a diaphragm shell in said casing suspended from said top and connected to said removable connection and having a diaphragm thereon, a substantially vertical stylus shaft rotatably mounted in said top centrally with respect to the sides of said recording track, strap means connected between the diaphragm and the shaft at a point eccentric to and transverse to said shaft adapted to translate diaphragm movement to rotational movement in said shaft, and a stylus arm above the top connected to said shaft having a tracer adapted to lie within said recording track, an adjustable spring in alignment with the direction of motion of the diaphragm and located between the strap and a portion of said top adapted to modify the rotary motion of said shaft, said stylus arm having an extendible joint therein adapted to be adjusted cooperably with the spring thereby to control the character of movement of the stylus point within the recording track, an elevator on said top adapted to raise said stylus to inoperative position from an operative position and a switch adapted to energize the motor responsive to movement of said elevator to said operative position.

5. In a graphometer a plate, a recording track for a moving strip of paper on the plate, a stylus on the shaft adapted to trace a graph line on the paper, a diaphragm cone and a diaphragm having a normal position of attachment at the edge of the cone and responsive to pressure changes, a link between the diaphragm and the shaft adapted to transmit diaphragm motion to the shaft, said cone having a wall portion of progressively diminishing curvature terminating in a marginal area adjacent the position of attachment of the diaphragm, said portion of progressively diminishing curvature having a varying position of contact with the diaphragm under pressure conditions other than normal whereby to vary the effective area of the diaphragm subject to pressure differential and the magnitude of movement thereof.

References Cited in the file of this patent

UNITED STATES PATENTS

| Number | Name | Date |
|---|---|---|
| 228,479 | Sherman | June 8, 1880 |
| 409,087 | Williams | Aug. 13, 1889 |
| 484,411 | De Forest | Oct. 18, 1892 |
| 1,060,761 | Hodgkinson | May 6, 1913 |
| 1,136,648 | Bristol | Apr. 20, 1915 |
| 1,154,438 | Rose | Sept. 21, 1915 |
| 1,181,037 | Rickert et al | Apr. 25, 1916 |
| 1,256,858 | Wollenweber | Feb. 19, 1919 |
| 1,961,170 | Robinson | June 5, 1934 |
| 2,196,909 | Bradford | Apr. 9, 1940 |
| 2,251,632 | Neal | Aug. 5, 1941 |
| 2,393,960 | Allen | Feb. 5, 1946 |
| 2,440,647 | Vogel | Apr. 27, 1948 |